Patented Aug. 11, 1925.

1,549,573

UNITED STATES PATENT OFFICE.

LORENZO CIAFFONE, OF BROOKLYN, NEW YORK.

FLUX FOR SOLDERING.

No Drawing. Application filed March 23, 1925. Serial No. 17,846.

*To all whom it may concern:*

Be it known that I, LORENZO CIAFFONE, a citizen of Italy, and a resident of the city of New York, borough of Brooklyn, in the county of Kings and State of New York, have invented a new and Improved Flux for Soldering, of which the following is a full, clear, and exact description.

This invention relates to a flux for soldering. An object of the invention concerns the provision of a simple and efficient flux for soldering and preferably of particular utility in connection with the soldering of aluminum.

In its general aspect the invention comprises the provision of a flux which may be in the form of a paste or liquid comprising two simple ingredients. The general nature of the ingredients is a combination of an animal fat and a vegetable oil. Preferably I employ a combination of tallow and olive oil.

In the preferred form of the invention, I take a quantity of tallow and melt it and add two parts of olive oil to one part of tallow. This mixture is suitably agitated to properly incorporate the ingredients and is allowed to cool.

In using this flux, the joint to be soldered is immersed in the liquid, or rubbed with the liquid, and then ordinary solder is applied thereto by means of heat. One source of heat may be an ordinary soldering iron.

It is found that in using this flux in connection with the soldering of aluminum that the joint is permanent and stable and will not disintegrate, even when subjected to considerable stress.

What I claim is:—

1. A soldering flux which comprises one part tallow and two parts of olive oil.
2. A soldering flux which comprises one part animal fat and two parts vegetable oil.

LORENZO CIAFFONE.